(12) United States Patent
Tomeba et al.

(10) Patent No.: US 10,985,822 B2
(45) Date of Patent: Apr. 20, 2021

(54) BASE STATION APPARATUS, TERMINAL APPARATUS, AND COMMUNICATION METHOD

(71) Applicants: SHARP KABUSHIKI KAISHA, Sakai (JP); FG Innovation Company Limited, Tuen Mun (HK)

(72) Inventors: Hiromichi Tomeba, Sakai (JP); Ryota Yamada, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/337,845

(22) PCT Filed: Aug. 29, 2017

(86) PCT No.: PCT/JP2017/030871
§ 371 (c)(1),
(2) Date: Mar. 28, 2019

(87) PCT Pub. No.: WO2018/061570
PCT Pub. Date: Apr. 5, 2018

(65) Prior Publication Data
US 2020/0014446 A1 Jan. 9, 2020

(30) Foreign Application Priority Data
Sep. 29, 2016 (JP) .............................. JP2016-191050

(51) Int. Cl.
*H04W 4/00* (2018.01)
*H04B 7/06* (2006.01)
(Continued)

(52) U.S. Cl.
CPC ......... *H04B 7/0626* (2013.01); *H04B 7/0417* (2013.01); *H04B 7/0456* (2013.01);
(Continued)

(58) Field of Classification Search
CPC .............. H04W 72/042; H04W 76/27; H04W 72/0446; H04W 80/08; H04L 5/0053;
(Continued)

(56) References Cited

U.S. PATENT DOCUMENTS

| 9,319,120 B2 | 4/2016 | Nagata et al. | |
| 2015/0124736 A1* | 5/2015 | Ko | H04B 7/0626 370/329 |
| 2016/0050006 A1* | 2/2016 | Ko | H04B 7/0634 370/329 |

OTHER PUBLICATIONS

"3rd Generation Partnership Project; Technical Specification Group Radio Access Network; Evolved Universal Terrestrial Radio Access (E-UTRA); Physical layer procedures (Release 14)", 3GPP TS 36.213 V14.0.0 (Sep. 2016).

(Continued)

*Primary Examiner* — Atique Ahmed
(74) *Attorney, Agent, or Firm* — ScienBiziP, P.C.

(57) ABSTRACT

To provide a base station apparatus, a terminal apparatus and a communication method which enable improvements in throughput and communication quality while suppressing an increase in complexity even in a case that the accuracy of a CSI report is improved. A terminal apparatus is provide with: a receiver configured to receive a CSI-RS and configuration information of a CSI report; and a transmitter configured to transmit CSI relating to the CSI-RS, wherein the CSI includes a first PMI and a second PMI, the first PMI is an indicator indicating multiple vectors, the second PMI includes either or both of a first indicator and a second indicator, the first indicator is an indicator indicating one or more complex weights of a first dimension for the multiple vectors, the second indicator is an indicator indicating one or more complex weights of a second dimension for the multiple vectors, and configuration information of the CSI (Continued)

report includes information indicating whether or not the second PMI includes the first indicator.

4 Claims, 3 Drawing Sheets

(51) Int. Cl.
*H04B 17/336* (2015.01)
*H04B 7/0417* (2017.01)
*H04B 7/0456* (2017.01)
*H04L 5/00* (2006.01)
*H04W 80/08* (2009.01)

(52) U.S. Cl.
CPC ......... *H04B 7/0634* (2013.01); *H04B 7/0639* (2013.01); *H04B 17/336* (2015.01); *H04L 5/005* (2013.01); *H04W 80/08* (2013.01)

(58) Field of Classification Search
CPC ... H04L 5/0007; H04L 5/0048; H04L 1/1812; H04L 5/005; H04B 7/0626; H04B 17/336; H04B 7/0417; H04B 7/0456; H04B 7/0634; H04B 7/0639
See application file for complete search history.

(56) References Cited

OTHER PUBLICATIONS

Samsung, "New WID Proposal: Enhancements on Full-Dimension (FD) MIMO for LTE", RP-160623, 3GPP TSG RAN Meeting #71, Göteborg, Sweden, Mar. 7-10, 2016.
Huawei et al., "CSI Acquisition Framework for Massive MIMO in New Radio", R1-164374, 3GPP TSG RAN WG1 Meeting #85, Nanjing, China, May 23-27, 2016.

* cited by examiner

BASE STATION APPARATUS, TERMINAL APPARATUS, AND COMMUNICATION METHOD

TECHNICAL FIELD

The present invention relates to a base station apparatus, a terminal apparatus, and a communication method.

BACKGROUND ART

In a communication system such as Long Term Evolution (LTE) or LTE-Advanced (LTE-A) standardized by the Third Generation Partnership Project (3GPP), the communication area can be widened by taking a cellular configuration in which areas covered by base station apparatuses (base stations, transmission stations, transmission points, downlink transmission apparatuses, uplink reception apparatuses, a group of transmit antennas, a group of transmit antenna ports, component carriers, eNodeB) or transmission stations equivalent to the base station apparatuses are arranged in the form of multiple cells (Cells) being linked together. In such a cellular configuration, frequency efficiency can be improved by using the same frequency among neighboring cells or sectors.

The Multiple Input Multiple Output (MIMO) technique using multiple transmit antennas and receive antennas is effective for improvements in frequency efficiency. Frequency efficiency provided by MIMO technology is generally proportional to the number of antennas used. Therefore, in LTE-Advanced, it is specified that up to 16 transmit antenna ports are supported (NPL 1).

Next-generation mobile communication systems have been studied recently. In the next-generation mobile communication systems, techniques called Massive Multiple Input Multiple Output (MIMO) including a large number of antennas and Full Dimension (FD) MIMO have been studied as described in NPL 2. In Massive MIMO and FD MIMO, improvements in high capacity transmission and throughput by beamforming are expected. For improvements in frequency efficiency of a MIMO technique, improvements in precision of Channel state information (CSI) that a base station apparatus can identify are effective. For example, improvements in precision of a CSI report that a terminal apparatus feeds back to a base station apparatus are effective.

CITATION LIST

Non Patent Literature

NPL 1: 3GPP, TS36. 213, June, 2016.
NPL 2: Samsung, "Enhancements on Full-Dimension (FD) MIMO for LTE," RP-160623, March, 2016.

SUMMARY OF INVENTION

Technical Problem

However, introducing a new CSI report means that a base station apparatus and a terminal apparatus include a new function and increases complexity. A communication system needs to be able to accommodate in both an apparatus performing a new CSI report and an apparatus performing an existing CSI report because it is expected recently that a communication system is required to have backward compatibility.

The present invention has been made in view of such circumstances, and an object of the present invention is to provide a base station apparatus, a terminal apparatus and a communication method which enable improvements in throughput and communication quality while suppressing an increase in complexity even in a case that the accuracy of a CSI report is improved.

Solution to Problem

To address the above-mentioned drawbacks, a base station apparatus, a terminal apparatus, and a communication method according to an aspect of the present invention are configured as follows.

(1) The terminal apparatus according to one aspect of the present invention is a terminal apparatus for communicating with a base station apparatus, the terminal apparatus including: a receiver configured to receive a channel state information reference signal (CSI-RS) and configuration information of a channel state information (CSI) report from the base station apparatus; and a transmitter configured to transmit channel state information (CSI) related to the CSI-RS to the base station apparatus, wherein the CSI includes a first PMI and a second PMI, the first PMI is an indicator indicating multiple vectors, the second PMI includes either or both of a first indicator and a second indicator, the first indicator is an indicator indicating one or more complex weights of a first dimension for multiple vectors, the second indicator is an indicator indicating one or more complex weights of a second dimension for multiple vectors, and the configuration information of the CSI report includes information indicating whether or not the second PMI includes the first indicator.

(2) Moreover, the terminal apparatus according to one aspect of the present invention is the terminal apparatus according to (1), wherein the configuration information of the CSI report includes configuration information of multiple CSI processes, and whether including the first indicator or not is configured for each of the CSI processes.

(3) Moreover, the terminal apparatus according to one aspect of the present invention is the terminal apparatus according to (1), wherein the configuration information of the CSI report includes configuration information of multiple CSI resources, and whether including the first indicator or not is configured for each of the multiple CSI resources.

(4) Moreover, the terminal apparatus according to one aspect of the present invention is the terminal apparatus according to (1), wherein the configuration information of the CSI report includes configuration information of multiple CSI resources, the CSI includes an indicator indicating one of the multiple CSI resources, and the first indicator is calculated based on the CSI-RS transmitted in a CSI resource indicated by the indicator indicating one of the multiple CSI resources.

(5) Moreover, the terminal apparatus according to one aspect of the present invention is the terminal apparatus according to (1), wherein the first indicator is to indicate one of at least two vectors, and the at least two vectors include a vector including only one non-zero element and a vector including two or more non-zero elements.

(6) Moreover, the terminal apparatus according to one aspect of the present invention is the terminal apparatus according to any one of (1) to (5), wherein the first dimension refers to an intra polarized wave, and the second dimension is inter polarized waves.

(7) Moreover, the base station apparatus according to one aspect of the present invention is a base station apparatus for communicating with a terminal apparatus, the base station apparatus including: a transmitter configured to transmit a channel state information reference signal (CSI-RS) and configuration information of a channel state information (CSI) report to the terminal apparatus; and a receiver configured to receive channel state information (CSI) related to the CSI-RS, wherein the channel state information includes a first PMI and a second PMI, the first PMI is an indicator indicating multiple vectors, the second PMI includes either or both of a first indicator and a second indicator, the first indicator is an indicator indicating a complex weight of a first dimension for the multiple vectors, the second indicator is an indicator indicating a complex weight of a second dimension for the multiple vectors, and the configuration information of the CSI report includes information indicating whether or not the second PMI includes the first indicator.

(8) Moreover, the communication method according to one aspect of the present invention is a communication method of a terminal apparatus for communicating with a base station apparatus, the communication method including the steps of: receiving a channel state information reference signal (CSI-RS) and configuration information of a channel state information (CSI) report from the base station apparatus; and transmitting channel state information (CSI) related to the CSI-RS to the base station apparatus, wherein the CSI includes a first PMI and a second PMI, the first PMI is an indicator indicating multiple vectors, the second PMI includes either or both of a first indicator and a second indicator, the first indicator is an indicator indicating a complex weight of a first dimension for the multiple vectors, the second indicator is an indicator indicating a complex weight of a second dimension for the multiple vectors, and the configuration information of the CSI report includes information indicating whether or not the second PMI includes the first indicator.

Advantageous Effects of Invention

The present invention can improve throughput and communication quality while avoiding increase in complexity.

DESCRIPTION OF EMBODIMENTS

A communication system according to the present embodiment includes a base station apparatus (a transmission apparatus, cells, a transmission point, a group of transmit antennas, a group of transmit antenna ports, component carriers, eNodeB) and a terminal apparatus (a terminal, a mobile terminal, a reception point, a reception terminal, a reception apparatus, a group of receive antennas, a group of receive antenna ports, a UE). A base station apparatus connected with (establishing a radio link with) a terminal apparatus is referred to as a serving cell.

The base station apparatus and the terminal apparatus according to the present embodiment can communicate in a frequency band or a so-called a licensed band that has obtained permission to use (license) from a country or a region where a radio operator provides a service, and/or a frequency band or a so-called unlicensed band that does not need permission to use (license) from a country or a region.

According to the present embodiment, "X/Y" includes the meaning of "X or Y". According to the present embodiment, "X/Y" includes the meaning of "X and Y". According to the present embodiment, "X/Y" includes the meaning of "X and/or Y".

Figure 1:
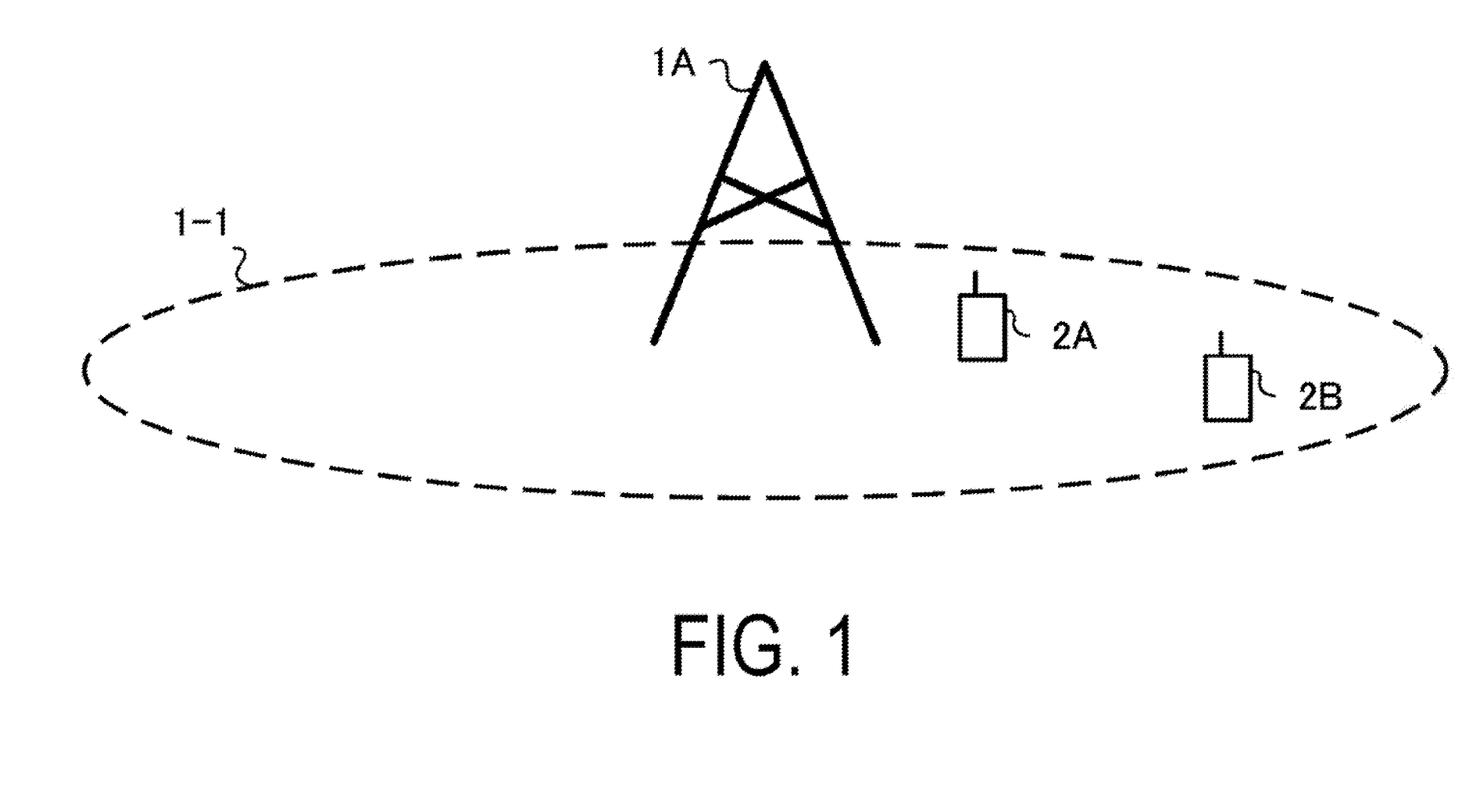
FIG. 1 is a diagram illustrating an example of a communication system according to the present embodiment.

FIG. 1 is a diagram illustrating an example of a communication system according to the present embodiment. As illustrated in FIG. 1, the communication system according to the present embodiment includes a base station apparatus 1A and terminal apparatuses 2A and 2B. Coverage 1-1 is a range (a communication area) in which the base station apparatus 1A can connect to the terminal apparatuses. The terminal apparatuses 2A and 2B are also collectively referred to as terminal apparatuses 2.

With respect to FIG. 1, the following uplink physical channels are used for uplink radio communication from the terminal apparatus 2A to the base station apparatus 1A. The uplink physical channels are used for transmitting information output from a higher layer.

Physical Uplink Control Channel (PUCCH)
Physical Uplink Shared Channel (PUSCH)
Physical Random Access Channel (PRACH)

The PUCCH is used to transmit Uplink Control Information (UCI). The Uplink Control Information includes a positive acknowledgement (ACK) or a negative acknowledgement (NACK) (ACK/NACK) for downlink data (a downlink transport block or a Downlink-Shared Channel (DL-SCH)). The ACK/NACK for the downlink data is also referred to as a HARQ-ACK or HARQ feedback.

Here, the Uplink Control Information includes Channel State Information (CSI) for the downlink. The Uplink Control Information includes a Scheduling Request (SR) used to request an Uplink-Shared Channel (UL-SCH) resource. The Channel State Information refers to a Rank Indicator (RI) specifying a suited spatial multiplexing number, a Precoding Matrix Indicator (PMI) specifying a suited precoder, a Channel Quality Indicator (CQI) specifying a suited transmission rate, a CSI-RS (Reference Signal) resource indicator CRI (CSI-RS Resource Indication) indicating a suited CSI-RS resource, and the like.

The Channel Quality Indicator (hereinafter, referred to as a CQI value) can be a suited modulation scheme (e.g., QPSK, 16 QAM, 64 QAM, 256 QAM, or the like) and a suited coding rate in a prescribed band (details of which will be described later). The CQI value can be an index (CQI Index) determined by the above change scheme, coding rate, and the like. The CQI value can take a value determined beforehand in the system.

The Rank Indicator and the Precoding Quality Indicator can take the values determined beforehand in the system. Each of the Rank Indicator, the Precoding Matrix Indicator, and the like can be an index determined by the number of spatial multiplexing, Precoding Matrix information, or the like. Note that values of the Rank Indicator, the Precoding Matrix Indicator, and the Channel Quality Indicator are collectively referred to as CSI values.

The base station apparatus and the terminal apparatus included in the communication system of the present embodiment can also use values other than the above-described indicator as CSI values.

For example, the terminal apparatus can report a value where a complex channel gain of a channel with the base station apparatus is quantized directly to the base station apparatus as a CSI value. The terminal apparatus can arrange a method to quantize the complex channel gain beforehand with the base station apparatus. For example, the terminal apparatus can quantize each of a real part and an imaginary part of the complex channel gain in the prescribed number of bits. For example, the terminal apparatus can quantize each of an amplitude and a phase of the complex channel gain in the prescribed number of bits. Note that the terminal apparatus can quantize at equal intervals within a part or all of the complex channel gain. Note that the terminal apparatus can quantize the complex channel gain in a part in a different interval from an interval for other ranges.

For example, the terminal apparatus can quantize the complex channel gain by using a prescribed table (list) with multiple signal points listed in. In this case, the terminal apparatus can report the index of the signal point closest to the complex channel gain to the base station apparatus. The multiple signal points listed in the prescribed table can be placed on a complex plane at equal intervals. The multiple signal points listed in the prescribed table can be plurally arranged into a form of multiple concentric circles like multi-level PSK. In the form of the multiple concentric circles, the numbers of the signal points which are plurally arranged may be different for each of the multiple concentric circles. For example, the number of the signal points may be configured in proportion to the concentric radius. Note that the multiple signal points listed in the prescribed table does not need to be placed at equal intervals. For example, in a case that an amplitude of the complex channel gain is small, there can be a larger number of signal points than a case that an amplitude is large.

For example, the terminal apparatus can quantize one or more complex channel gains using a prescribed codebook shared with the base station apparatus. Multiple vectors calculated based on an orthogonal base or a non-orthogonal base can be listed in the prescribed codebook. The terminal apparatus can report, to the base station apparatus, the index indicating the vector closest to the channel vector (Euclidean distance is close, a norm of the prescribed number with the channel vector is small) which assumes one or more complex channel gains with the base station apparatus as elements among the multiple vectors listed in the prescribed codebook.

The terminal apparatus can report two or more vectors among the multiple vectors listed in the prescribed codebook, details of which are described below. This is because a vector with two or more vectors linearly synthesized by a prescribed method may be the vector closest to the channel vector. In a case that the terminal apparatus reports two or more vectors, the terminal apparatus can report the information (e.g., composition weights and complex weights) indicating the method to linearly synthesize the two or more vectors.

At this time, the chordal distance (Euclidean distance) between the multiple vectors listed in the prescribed codebook which the terminal apparatus refers to may be at equal intervals or may be partially at equal intervals.

Subjects which the terminal apparatus quantizes are not limited to the complex channel gain of the channel with the base station apparatus. The subjects which the terminal apparatus quantizes include a covariance matrix of the channel, an eigenvector of the channel, an eigenvalue of the channel, a precoding filter which is preferable to the own apparatus, a precoding filter which is non-preferable to the own apparatus. Note that the terminal apparatus does not have to quantize all of the subjects to quantize and can quantize partially and report the quantized subject(s). For example, in a case that the terminal apparatus quantizes an eigenvector of the channel, and a rank of a channel matrix is 4, there are four eigenvectors; however, the terminal apparatus does not have to quantize all four eigenvectors and may quantize the prescribed number of eigenvectors. The base station apparatus can notify the terminal apparatus of information indicating the prescribed number as control information of the downlink. The terminal apparatus may quantize eigenvectors corresponding to eigenvalues equal to or more than a certain threshold.

In a case that the terminal apparatus reports the value where the complex channel gain of the channel with the base station apparatus is quantized as a CSI value, the so-called rank (the number of layers) suitable for the own apparatus cannot be defined. This is because, in a case that the terminal apparatus reports the complex channel gain to the base station apparatus as a CSI value, this CSI report is an Explicit CSI report that the base station apparatus determines a precoder, and the terminal apparatus does not identify the rank of the real data transmission. Therefore, the base station apparatus can notify the rank to assume in calculation of the CSI report to the terminal apparatus. At this time, the terminal apparatus can assume the rank indicated by the base station apparatus and report the CSI where the complex channel gain is quantized. In the absence of an indication of the rank from the base station apparatus, the terminal apparatus can report the CSI where the complex channel gain is quantized, based on the rank that is assumed (or reported, indicated) most recently. Note that in a case that there is no indication of the rank from the base station apparatus, and in the absence of the rank that is assumed (or reported, indicated) most recently, the terminal apparatus can calculate the CSI where the complex channel gain is quantized assuming the rank as 1.

The terminal apparatus can calculate the rank that is suitable for the own apparatus, based on the channel capacity that can be calculated from the channel gain with the base station apparatus (parameter indicating the maximum bit number which can be transmitted in the channel, parameter indicating the maximum bit number which can transmitted without an error in the channel). In this case, the terminal apparatus can calculate the channel capacity based on a formula (or a table) of the channel capacity that is shared with the base station apparatus beforehand, and notify the base station apparatus of the rank by which the maximum channel capacity is accomplished. Note that the channel capacity calculated in this case can be calculated assuming the contents of the CSI report of which the terminal apparatus notifies the base station apparatus.

The terminal apparatus can report a CQI to the base station apparatus. The terminal apparatus can report the CQI, based on a table of 4 bits. The indexes of 4 bits indicate a combination of different modulation schemes and coding rates (MCS set). The terminal apparatus can report an eigenvalue or a channel capacity as the CQI. In a case that the terminal apparatus reports an eigenvalue or a channel capacity as the CQI, the CQI can be reported based on a table of 4 bits. At this time, the terminal apparatus can refer to a table (also referred to as a second table) which is different from the table (also referred to as a first table) where the above-mentioned MCS set is listed in. The base station apparatus can notify (indicate) the terminal apparatus of whether the CQI is calculated and reported with reference to the first table or the second table. Note that the second table does not necessarily be expressed by 4 bits, and may be expressed by a bit number more than 4 bits and may be expressed by a bit number less than 4 bits. In a case that the second table is expressed by a bit number more than 4 bits, the terminal apparatus may increase the bit number required for the CSI report.

The PUSCH is used for transmission of uplink data (an uplink transport block, UL-SCH). Furthermore, the PUSCH may be used for transmission of ACK/NACK and/or Channel State Information along with the uplink data. In addition, the PUSCH may be used to transmit the Uplink Control Information only.

The PUSCH is used to transmit an RRC message. The RRC message is a signal/information that is processed in a Radio Resource Control (RRC) layer. Further, the PUSCH is used to transmit a MAC Control Element (CE). Here, the MAC CE is a signal/information that is processed (transmitted) in a Medium Access Control (MAC) layer.

For example, a power headroom may be included in MAC CE and may be reported via PUSCH. In other words, a MAC CE field may be used to indicate a level of the power headroom.

The PRACH is used to transmit a random access preamble.

In the uplink radio communication, an Uplink Reference Signal (UL RS) is used as an uplink physical signal. The uplink physical signal is not used for transmission of information output from higher layers, but is used by the physical layer. The Uplink Reference Signal includes a Demodulation Reference Signal (DMRS) and a Sounding Reference Signal (SRS).

The DMRS is associated with transmission of the PUSCH or the PUCCH. For example, the base station apparatus 1A uses DMRS in order to perform channel compensation of PUSCH or PUCCH. The SRS is not associated with the transmission of the PUSCH or the PUCCH. For example, the base station apparatus 1A uses SRS to measure an uplink channel state.

In FIG. 1, the following downlink physical channels are used for the downlink radio communication from the base station apparatus 1A to the terminal apparatus 2A. The downlink physical channels are used for transmitting information output from the higher layer.

Physical Broadcast Channel (PBCH)
Physical Control Format Indicator Channel (PCFICH)
Physical Hybrid automatic repeat request Indicator Channel (PHICH)
Physical Downlink Control Channel (PDCCH)
Enhanced Physical Downlink Control Channel (EPDCCH)
Physical Downlink Shared Channel (PDSCH)

The PBCH is used for broadcasting a Master Information Block (MIB, a Broadcast Channel (BCH)) that is shared by the terminal apparatuses. The PCFICH is used for transmission of information indicating a region (e.g., the number of OFDM symbols) to be used for transmission of PDCCH.

The PHICH is used for transmission of ACK/NACK with respect to uplink data (a transport block, a codeword) received by the base station apparatus 1A. In other words, PHICH is used for transmission of a HARQ indicator (HARQ feedback) indicating ACK/NACK with respect to the uplink data. Note that ACK/NACK is also called HARQ-ACK. The terminal apparatus 2A reports ACK/NACK having been received to a higher layer. ACK/NACK refers to ACK indicating a successful reception, NACK indicating an unsuccessful reception, and DTX indicating that no corresponding data is present. In a case that PHICH for uplink data is not present, the terminal apparatus 2A reports ACK to a higher layer.

The PDCCH and the EPDCCH are used to transmit Downlink Control Information (DCI). Here, multiple DCI formats are defined for transmission of the downlink control information. In other words, a field for the downlink control information is defined in a DCI format and is mapped to information bits.

For example, as a DCI format for the downlink, DCI format 1A to be used for the scheduling of one PDSCH in one cell (transmission of a single downlink transport block) is defined.

For example, the DCI format for the downlink includes downlink control information such as information of PDSCH resource allocation, information of a Modulation and Coding Scheme (MCS) for PDSCH, a TPC command for PUCCH, and the like. Here, the DCI format for the downlink is also referred to as downlink grant (or downlink assignment).

Furthermore, for example, as a DCI format for the uplink, DCI format 0 to be used for the scheduling of one PUSCH in one cell (transmission of a single uplink transport block) is defined.

For example, the DCI format for the uplink includes uplink control information such as information of PUSCH resource allocation, information of MCS for PUSCH, a TPC command for PUSCH, and the like. Here, the DCI format for the uplink is also referred to as uplink grant (or uplink assignment).

The DCI format for the uplink can be used to request (CSI request) downlink Channel State Information (CSI), which is also called reception quality information.

The DCI format for the uplink can be used for a configuration indicating an uplink resource to which a CSI feedback report is mapped, the CSI feedback report being fed back to the base station apparatus by the terminal apparatus. For example, the CSI feedback report can be used for a configuration indicating an uplink resource for periodically reporting Channel State Information (Periodic CSI). The CSI feedback report can be used for a mode configuration (CSI report mode) to periodically report the Channel State Information.

For example, the CSI feedback report can be used for a configuration indicating an uplink resource to report aperiodic Channel State Information (Aperiodic CSI). The CSI feedback report can be used for a mode configuration (CSI report mode) to aperiodically report the Channel State Information. The base station apparatus can configure any one of the periodic CSI feedback report and the aperiodic CSI feedback report. The base station apparatus can configure both the periodic CSI feedback report and the aperiodic CSI feedback report.

The base station apparatus can transmit an aperiodic Channel State Information (Aperiodic CSI report trigger, CSI trigger) to request the terminal apparatus of aperiodic CSI feedback report to the terminal apparatus. The aperiodic CSI report trigger includes a Channel State Information report trigger field. The base station apparatus can include information related to the CSI which the terminal apparatus reports to the base station apparatus in the CSI trigger. The base station apparatus can include information related to the rank of the CSI which the terminal apparatus reports to the base station apparatus in the CSI trigger. For example, in a case that the base station apparatus requests the CSI report associated with a prescribed rank to the terminal apparatus, the base station apparatus can describe the information indicating the prescribed rank in the CSI trigger.

The DCI format for the uplink can be used for a configuration indicating a type of the CSI feedback report that is fed back to the base station apparatus by the terminal apparatus. The type of the CSI feedback report includes wideband CSI (e.g., Wideband CQI), narrowband CSI (e.g., Subband CQI), and the like.

In a case where a PDSCH resource is scheduled in accordance with the downlink assignment, the terminal apparatus receives downlink data on the scheduled PDSCH. In a case where a PUSCH resource is scheduled in accordance with the uplink grant, the terminal apparatus transmits uplink data and/or uplink control information of the scheduled PUSCH.

PDSCH is used for transmission of downlink data (a downlink transport block, DL-SCH). PDSCH is used to transmit a system information block type 1 message. The system information block type 1 message is cell-specific information.

The PDSCH is used to transmit a system information message. The system information message includes a system information block X other than the system information block type 1. The system information message is cell-specific information.

PDSCH is used to transmit an RRC message. Here, the RRC message transmitted from the base station apparatus may be shared by multiple terminal apparatuses in a cell. Further, the RRC message transmitted from the base station apparatus 1A may be a dedicated message to a given terminal apparatus 2 (also referred to as dedicated signaling). In other words, user-equipment-specific information (unique to user equipment) is transmitted using a message dedicated to the given terminal apparatus. The PDSCH is used for transmission of MAC CE.

Here, the RRC message and/or MAC CE is also referred to as higher layer signaling.

The PDSCH can be used to request downlink channel state information. The PDSCH can be used for transmission of an uplink resource to which a CSI feedback report is mapped, the CSI feedback report being fed back to the base station apparatus by the terminal apparatus. For example, the CSI feedback report can be used for a configuration indicating an uplink resource for periodically reporting Channel State Information (Periodic CSI). The CSI feedback report can be used for a mode configuration (CSI report mode) to periodically report the Channel State Information.

The type of the downlink CSI feedback report includes wideband CSI (e.g., Wideband CSI) and narrowband CSI (e.g., Subband CSI). The wideband CSI calculates one piece of Channel State Information for the system band of a cell. The narrowband CSI divides the system band in prescribed units, and calculates one piece of Channel State Information for each division.

In the downlink radio communication, a Synchronization signal (SS) and a Downlink Reference Signal (DL RS) are used as downlink physical signals. The downlink physical signals are not used for transmission of information output from the higher layers, but are used by the physical layer.

The synchronization signal is used for the terminal apparatus to take synchronization in the frequency domain and the time domain in the downlink. The Downlink Reference Signal is used for the terminal apparatus to perform channel compensation on a downlink physical channel. For example, the Downlink Reference Signal is used for the terminal apparatus to calculate the downlink Channel State Information.

Here, the Downlink Reference Signals include a Cell-specific Reference Signal (CRS), a UE-specific Reference Signal (URS) or a terminal apparatus-specific reference signal relating to PDSCH, a Demodulation Reference Signal (DMRS) relating to EPDCCH, a Non-Zero Power Channel State Information-Reference Signal (NZP CSI-RS), and a Zero Power Channel State Information-Reference Signal (ZP CSI-RS).

CRS is transmitted in all bands of a subframe and is used to perform demodulation of PBCH/PDCCH/PHICH/PCFICH/PDSCH. URS relating to PDSCH is transmitted in a subframe and a band that are used for transmission of PDSCH to which URS relates, and is used to demodulate PDSCH to which URS relates.

DMRS relating to EPDCCH is transmitted in a subframe and a band that are used for transmission of EPDCCH to which DMRS relates. DMRS is used to demodulate EPDCCH to which DMRS relates.

A resource for NZP CSI-RS is configured by the base station apparatus 1A. For example, the terminal apparatus 2A performs signal measurement (channel measurement), using NZP CSI-RS. A resource for ZP CSI-RS is configured by the base station apparatus 1A. With zero output, the base station apparatus 1A transmits ZP CSI-RS. The terminal apparatus 2A performs interference measurement in a resource to which NZP CSI-RS corresponds, for example.

A Multimedia Broadcast multicast service Single Frequency Network (MBSFN) RS is transmitted in all bands of the subframe used for transmitting PMCH. MBSFN RS is used to demodulate PMCH. PMCH is transmitted on the antenna port used for transmission of MBSFN RS.

Here, the downlink physical channel and the downlink physical signal are also collectively referred to as a downlink signal. The uplink physical channel and the uplink physical signal are also collectively referred to as an uplink signal. The downlink physical channels and the uplink physical channels are collectively referred to as physical channels. The downlink physical signals and the uplink physical signals are also collectively referred to as physical signals.

BCH, UL-SCH, and DL-SCH are transport channels. Channels used in the Medium Access Control (MAC) layer are referred to as transport channels. A unit of the transport channel used in the MAC layer is also referred to as a Transport Block (TB) or a MAC Protocol Data Unit (PDU). The transport block is a unit of data that the MAC layer delivers to the physical layer. In the physical layer, the transport block is mapped to a codeword, and coding processing or the like is performed for each codeword.

For the terminal apparatus supporting Carrier Aggregation (CA), the base station apparatus can communicate aggregating multiple Component Carriers (CC) for broader band transmission. In Carrier Aggregation, one Primary Cell (PCell) and one or multiple Secondary Cells (SCell) are configured as a set of serving cells.

In Dual Connectivity (DC), a Master Cell Group (MCG) and a Secondary Cell Group (SCG) are configured as a group of serving cells. The MCG includes a PCell and one or multiple SCells in an option. The SCG includes a primary SCell (PSCell) and one or multiple SCells in an option.

The base station apparatus can transmit CSI-RS configuration information to the terminal apparatus. The CSI-RS configuration information includes some or all of the number of antenna ports, a resource configuration, and a subframe configuration. The resource configuration is information related to the resource where the CSI-RS is placed. The subframe configuration is information related to the cycle at which the subframe where the CSI-RS is placed and the CSI-RS are transmitted.

Non-precoded (also referred to as CLASS A) and/or beamformed (also referred to as CLASS B) are configured for the CSI-RS as an eMIMO type (CSI report type) related to the CSI report (feedback). Note that the CSI-RS where non-precoded (CLASS A) is configured is also referred to as a non-precoded CSI-RS (NP CSI-RS, first CSI-RS), and the CSI-RS where beamformed (CLASS B) is configured is also referred to as (BF CSI-RS, second CSI-RS). The base station apparatus can transmit information indicating the NP CSI-RS or the BF CSI-RS to the terminal apparatus. In other words, the terminal apparatus can receive information indicating the NP CSI-RS or the BF CSI-RS from the base station apparatus, to identify whether the configured CSI-RS is the NP CSI-RS or the BF CSI-RS. The NP-CSI-RS and/or the BF CSI-RS are used for CSI measurement, Radio Resource Manager (RRM) measurement, Radio Link Monitoring (RLM) measurement, and the like.

The base station apparatus can associate at least the CSI-RS for channel measurement and CSI-Interference Measurement (IM) for interference measurement with higher layer signaling, and include a configuration (CSI process) related to a procedure to calculate the channel state information in the signaling. The CSI process can include some or all of the CSI process ID, configuration information of the CSI-RS, the CSI-RS configuration ID, information indicating the NP CSI-RS or the BF CSI-RS (eMIMO type, CSI report type), configuration information of the NP CSI-RS, and the configuration information of the BF CSI-RS. The base station apparatus can configure one or more CSI processes. The base station apparatus can generate a feedback of the CSI for each of the CSI processes independently. The base station apparatus can configure CSI-RS resources and CSI-IM differently for each of the CSI processes. One or more CSI processes are configured to the terminal apparatus, and the terminal apparatus independently reports the CSI for each of the configured CSI processes. The CSI processes is configured in a prescribed transmit mode.

In the NP CSI-RS, one CSI-RS resource is configured. One CSI-RS resource can be constituted of multiple CSI-RS resource configurations. The number of antenna ports for each of the multiple CSI-RS resources may be the same or may be different from each other. For example, a CSI-RS resource with 12 ports is constituted of three 4-port CSI-RS resources. For example, a CSI-RS resource with 16 ports is constituted of two 8-port CSI-RS resources. For example, a CSI-RS resource with 20 ports is constituted of a configuration of a 12-port CSI-RS resource of and an 8-port CSI-RS resource. For example, a CSI-RS resource with 24 ports is constituted of three 8-port CSI-RS resources or two 12-port CSI-RS resources. For example, a CSI-RS resource with 28 ports is constituted of a 12-port CSI-RS resource and a 16-port CSI-RS resource or seven 4-port CSI-RS resources. For example, 32-port CSI-RS resource is constituted of two 16-port CSI-RS resources or four 8-port CSI-RS. Note that the configurations of CSI-RS resources for each number of antenna ports are examples and are not limited to these.

In a case that the CSI-RS configuration ID is configured, in the NP CSI-RS, one CSI-RS configuration ID is configured. The base station apparatus can spread the NP CSI-RS at multiple spreading ratio (spreading code length), and transmit the spread NP CSI-RS. The base station apparatus can transmit information indicating which spreading ratio (spreading code length) is used to the terminal apparatus. In other words, the terminal apparatus can identify the spreading ratio (spreading code length) used for the NP CSI-RS by the information indicating which spreading ratio (spreading code length) is used which is received from the base station apparatus.

The base station apparatus can configure an OFDM symbols and subcarrier spacing to which one NP CSI-RS is spread to a different value, based on the number of ports of the CSI-RS in a case of spreading the NP CSI-RS. For example, the base station apparatus can configure to include multiple OFDM symbols to which one NP CSI-RS is spread in one slot in a case that the number of ports of the CSI-RS is a prescribed value (e.g., 16) or less, and can configure to include multiple OFDM symbols to which one NP CSI-RS is spread in two slots (or in a subframe) in a case that the number of ports of the CSI-RS exceeds the prescribed value.

The base station apparatus can configure the configuration of the CSI-RS resource over multiple subframes. For example, in a case that the base station apparatus assumes m as a natural number and configures the CSI-RS resource of 20 ports, the CSI-RS resource of 12 ports for the m-th subframe can be configured, and the CSI-RS resource of eight ports for the (m+1)-th subframe can be configured. However, the above is an example, and is not limited to consecutive subframes. In other words, in a case of configuring multiple CSI-RS ports for the terminal apparatus, the base station apparatus according to the present embodiment can configure multiple subframes as subframes to configure the CSI-RS ports. In a case that the base station apparatus configures the configuration of the CSI-RS resource over multiple subframes, the configuration cycle (transmission cycle of the CSI-RS resource, configuration cycle of the CSI-RS resource) can vary in every subframe, or can be the same.

The base station apparatus can place a signal except the CSI-RS for at least one CSI-RS resource (or resource configuration) among the multiple CSI-RS resources (or resource configuration) configured for the terminal apparatus. The base station apparatus can configure configuration information (CSI-RS Subset Restriction) indicating the CSI-RS resource to place the signal except the CSI-RS for the terminal apparatus. The cycle when the base station apparatus configures the CSI-RS Subset Restriction for the terminal apparatus can be the same as the cycle when the base station apparatus configures the CSI-RS resource for the terminal apparatus, or can be a different cycle.

The number of antenna ports of the CSI-RS which the base station apparatus configures for the terminal apparatus can be limited depending on the DCI, the DCI format, or the description contents of the DCI format that the base station apparatus notifies the terminal apparatus of. For example, in a case that the base station apparatus configures a transmit mode of the uplink transmission of the terminal apparatus with the DCI, and the transmit mode is not included in prescribed transmit modes, the base station apparatus can limit the number of ports of the CSI-RS configured for the terminal apparatus to a prescribed number (e.g., 16 or less). In accordance with increase in the number of ports of the CSI-RS, the CSI feedback information amount included in the signal which the terminal apparatus transmits in the uplink transmission increases, and thus the base station apparatus can configure the CSI-RS resource with the number of ports being 16 or more for the terminal apparatus which can configure the transmit mode which can support (can transmit) the CSI feedback information amount. In other words, the base station apparatus can transmit to the terminal apparatus which can support (can transmit) the CSI feedback information amount by using the number of antenna ports equal to or larger than a prescribed number (e.g., 16 or more ports).

In a case that the NP CSI-RS is configured, the base station apparatus can transmit configuration information of the NP CSI-RS to the terminal apparatus. The configuration information of the NP CSI-RS includes some or all of the number of antenna ports, information related to the Codebook Subset Restriction (CBSR), information related to the codebook, interference measurement restriction that is a configuration whether or not to put a resource limit for measuring interference, one or multiple resource configurations, spreading code length. Note that the base station apparatus can configure the resource configurations and the number of antenna ports in association with each other. For example, in a case that the configuration information of the NP CSI-RS includes multiple the numbers of antenna ports, multiple one or multiple resource configurations, each of the numbers of antenna ports and one or each of multiple resource configurations are associated.

Figure 2:
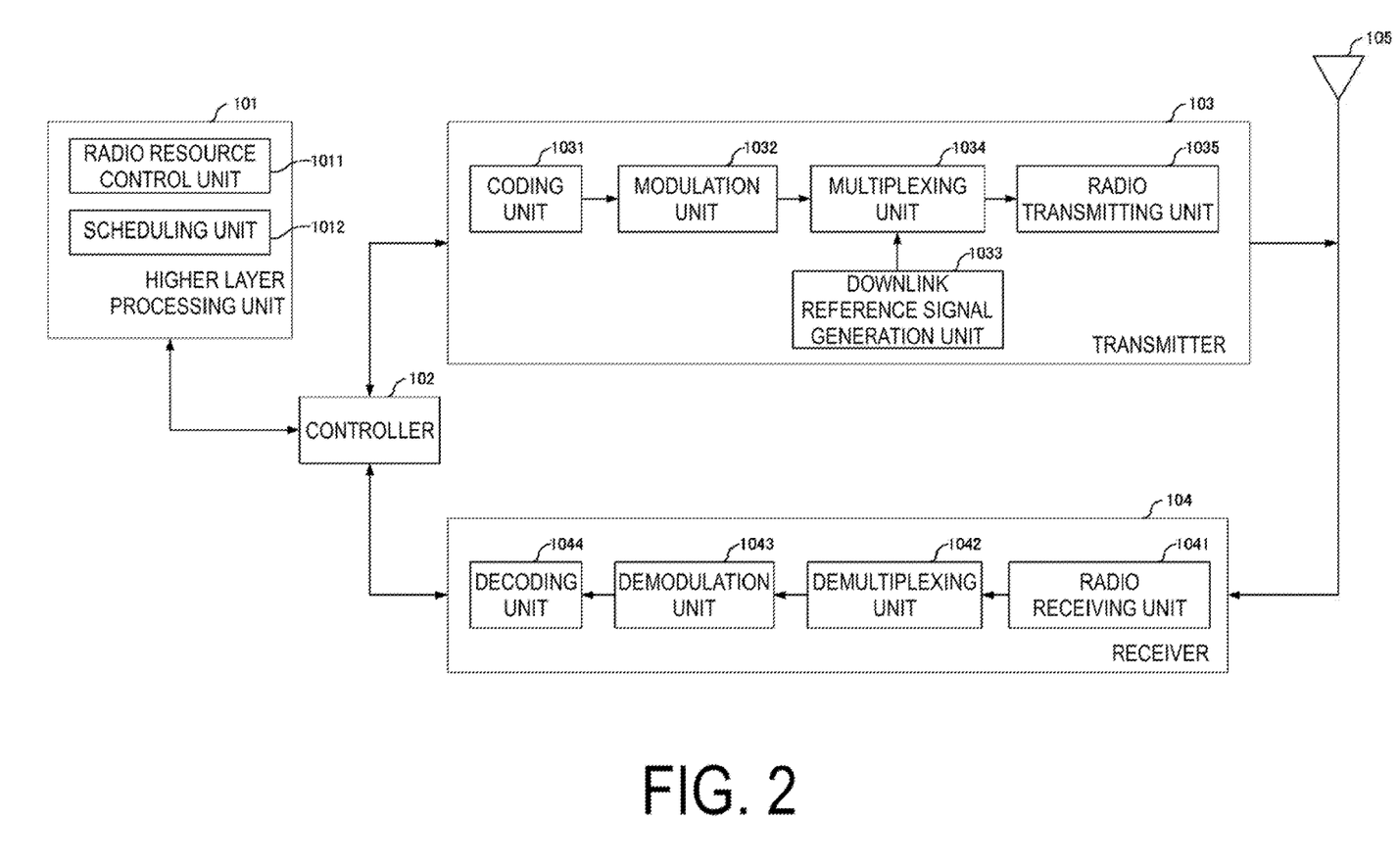
FIG. 2 is a block diagram illustrating a configuration example of a base station apparatus according to the present embodiment.

In a case of transmitting the CSI-RS with a large number of antenna ports, resources for transmitting the CSI-RS increase. Therefore, reducing overhead of the CSI-RS transmission improves throughput. A transmission cycle of the CSI-RS can be lengthened to reduce overhead of the CSI-RS transmission. For example, considering horizontal beamforming and vertical beamforming, the preferable change in the vertical beams is generally gentler than the preferable change in the horizontal beams. Therefore, lengthening the transmission cycle (interval) of the CSI-RS associated with the vertical beams can reduce overhead of the CSI-RS transmission. For example, in a case that there are eight antenna ports in the horizontal direction and four antenna ports in the vertical direction, there are 32 antenna ports in total. At this time, as illustrated in FIG. 2, the base station apparatus can transmit the CSI-RS of eight ports in the cycle TH in the horizontal direction and transmit the CSI-RS of 32 ports in the cycle TV. Note that TH<TV is established. The CSI-RS configuration information of eight ports may be included in the CSI-RS configuration information of 32 ports, or the CSI-RS configuration information of eight ports and the CSI-RS configuration information of 32 ports may be different configurations. In a case that the CSI-RS configuration information of eight ports and the CSI-RS configuration information of 32 ports are different configurations, it is necessary for the two pieces of configuration information to be linked. For example, the CSI-RS configuration ID included in the CSI-RS configuration information of eight ports and the CSI-RS configuration ID included in the CSI-RS configuration information of 32 ports can be the same. In this case, the terminal apparatus can calculate and report the CSI in consideration of the CSI related to the same CSI-RS configuration ID. The ID of the reference destination can be included in the CSI-RS configuration information of eight ports or 32 ports. At this time, the terminal apparatus can calculate and report the CSI in consideration of the CSI related to the ID of the reference destination. Thus, even in a case that the CSI-RS of 32 ports is configured, the base station apparatus can reduce overhead of the CSI-RS to transmit the CSI-RS of 8 ports or the CSI-RS of 32 ports, in comparison with the case to continue transmitting the CSI-RS of 32 ports. The base station apparatus can include the transmission cycle of the CSI-RS in the configuration information of the NP CSI-RS. For example, in a case that the CSI-RS of 32 ports is configured, the terminal apparatus can determine (identify) whether the CSI-RS of eight ports is transmitted or the CSI-RS of 32 ports is transmitted from the configuration information of the CSI-RS and/or the NP CSI-RS which is received from the base station apparatus. In a case that the CSI-RS of 32 ports is configured but the CSI-RS of 8 ports is received, the terminal apparatus can calculate the CQI/PMI/RI from the CSI-RS of 8 ports and report the calculation result to the base station apparatus, or can calculate the CQI/PMI/RI of 8 ports by using the CQI/PMI/RI of 32 ports calculated at the time of a former report and report the calculation result to the base station apparatus.

In the case of a large number of antenna ports, the base station apparatus can configure the transmission cycle of the CSI-RS longer. In other words, the base station apparatus can change the transmission cycle of the CSI-RS to be configured, depending on the number of antenna ports. For example, a longer cycle is configured for a case that the number of antenna ports is more than 16 than a case that the number of antenna ports is 16 or less. For example, in a case that the number of antenna ports of the CSI-RS more than 16, the base station apparatus can include the transmission cycle of the CSI-RS in the configuration information of the CSI-RS or the configuration information of the NP CSI-RS.

In the BF CSI-RS, one or multiple CSI-RS resources are configured. Here, assume the number of CSI-RS resources as K (K is a natural number). Among the multiple CSI-RS, at least one is beamformed to a different beam direction. The maximum number of antenna ports of the BF CSI-RS is less than the maximum number of antenna ports of the NP CSI-RS. In the BF CSI-RS, in a case that the CSI-RS ID is configured, one or multiple CSI-RS IDs are configured. In a case that the BF CSI-RS has been configured, the terminal apparatus selects the preferable CSI-RS resource from the multiple CSI-RS resources and reports the CQI/PMI/RI/CRI to the base station apparatus as a CSI.

In a case that the BF CSI-RS is configured, the base station apparatus can transmit the configuration information of the BF CSI-RS to the terminal apparatus. The configuration information of BF CSI-RS includes some or multiple of: one or more CSI-RS configuration IDs, interference measurement restriction, information related to the Codebook Subset Restriction (CBSR), an indication of other codebooks in four ports for each of the CSI-RS configuration IDs, information related to the codebook of the BF CSI-RS, channel measurement restriction that is a configuration whether or not to limit a resource (subframe) at the time of the channel measurement.

The base station apparatus can obtain the channel information of the terminal apparatus by the CSI report from the terminal apparatus. In a case that the NP CSI-RS (CLASS A) is configured, the terminal apparatus can report the CQI/PMI/RI to the base station apparatus. In a case that the BF CSI-RS (CLASS B) is configured, the terminal apparatus can report the CQI/PMI/RI/CRI to the base station apparatus. In a case that both the NP CSI-RS and the BF CSI-RS (also referred to as CLASS C) are configured, the terminal apparatus reports the CSI related to the NP CSI-RS and the CSI related to the BF CSI-RS.

In a case that both the NP CSI-RS and the BF CSI-RS are configured, the base station apparatus can change the transmission cycle of the NP CSI-RS and the transmission cycle of the BF CSI-RS. For example, the base station apparatus can configure the transmission cycle of the NP CSI-RS to be longer than the transmission cycle of the BF CSI-RS.

The base station apparatus can configure multiple BF CSI-RSs with different values of K. The base station apparatus can change the transmission cycle of the CSI-RS according to the value of K. Overhead of the CSI-RS increases as the value of K increases, and thus increasing the CSI-RS transmission cycle as the value of K increases can reduce the overhead of the CSI-RS. For example, in a case that the BF CSI-RS with K=1 and the BF CSI-RS with K>1 are configured, the transmission cycle of the BF CSI-RS with K=1 can be configured shorter than the BF CSI-RS with K>1.

In a case that multiple BF CSI-RS varying in the value of K are configured, the terminal apparatus reports the CQI/PMI/RI/CRI for each of the configured BF CSI-RS to the base station apparatus. Alternatively, the terminal apparatus selects a preferable BF CSI-RS resource from all the configured BF CSI-RS resources and reports the CQI/PMI/RI/CRI of the BF CSI-RS to the base station apparatus.

In addition to transmitting the CSI-RS periodically, the CSI-RS can transmit aperiodically. The periodic CSI-RS is also referred to as Periodic CSI-RS (P-CSI-RS, cyclic CSI-RS), and the aperiodic CSI-RS is also referred to as Aperiodic CSI-RS (A-CSI-RS, non-cyclic CSI-RS). For example, the A-CSI-RS is transmitted at the timing that the base station apparatus indicates. In this case, the terminal apparatus receives the A-CSI-RS at the timing indicated in control information or the like by the base station apparatus. The configuration information of the P-CSI-RS and/or the configuration information of the A-CSI-RS are transmitted by higher layer signaling or physical layer signaling such as uplink control information and the like. The configuration information of the A-CSI-RS includes some or all of the number of antenna ports, a CSI-RS configuration ID, a resource configuration, a CSI report type, and a subframe (resource) to report the CSI. The configuration information of the P-CSI-RS and/or the configuration information of the A-CSI-RS can be included in the configuration information of the CSI-RS described above. In a case that the base station apparatus transmits the information related to the A-CSI-RS by being included in downlink control information, the base station apparatus transmits the CSI-RS with the same subframe (slot) as the downlink control information. In other words, in a case that the information related to the A-CSI-RS is included in the received downlink control information, the terminal apparatus receives the A-CSI-RS with the same subframe (slot) as this downlink control information. The A-CSI-RS is transmitted at a certain timing in this way and the CSI-RS is not transmitted unnecessarily, and thus the overhead of the CSI-RS can be reduced.

In a case that the P-CSI-RS and the A-CSI-RS collide, the terminal apparatus gives priority to the A-CSI-RS and reports the CSI or the like. In a case that the NP CSI-RS is configured as the P-CSI-RS and the BF CSI-RS is received as the A-CSI-RS, the terminal apparatus reports the CSI related to the BF CSI-RS. On the other hand, in a case that the BF CSI-RS is configured as the P-CSI-RS and the NP CSI-RS is received as the A-CSI-RS, the terminal apparatus reports the CSI related to the NP CSI-RS.

An initial value to generate a P-CSI-RS sequence and an initial value to generate an A-CSI-RS sequence can be made different from each other. For example, a physical cell ID can be used for the initial value of the P-CSI-RS sequence, and an ID unique to a user can be used for the A-CSI-RS. In this case, the terminal apparatus can determine whether the received CSI-RS is the P-CSI-RS or the A-CSI-RS by identifying the initial value of the CSI-RS sequence.

The terminal apparatus can feed back multiple PMIs to the base station apparatus. The PMI is for the terminal apparatus to notify the base station apparatus of a precoder which is desirable (preferable) for the own apparatus. In the following, the precoder can be a vector or a linear filter including, as elements, one or more complex weights to be multiplied to a transmit signal in transmit antennas in a case that the base station apparatus transmits the transmit signal from multiple transmit antennas. The terminal apparatus can notify PMI1 (first PMI) and PMI2 (second PMI) to the base station apparatus as multiple PMIs. The terminal apparatus can report both the PMI1 and the PMI2 to the base station apparatus and can report the PMI1 and the PMI2 separately. In a case of reporting the PMI1 and the PMI2 separately, the terminal apparatus can configure the cycle to report the PMI1 to the base station apparatus and the cycle to report the PMI2 to the base station apparatus to different values.

Through the PMI1 which the terminal apparatus reports, multiple precoders (vectors) can be reported with one index. For example, in a case that elements listed in the codebook (or some of the elements to constitute a codebook) to refer to in calculation of the PMI1 by the terminal apparatus are listed based on a DFT matrix, one column vector listed in the codebook represents the beam for the angular direction associated with the selected column vector. At this time, the PMI1 can represent multiple vectors with one index.

Of course, in a case that the terminal apparatus reports only the PMI1 to the base station apparatus, the base station apparatus does not understand which of the multiple vectors that the PMI1 indicates is the precoder preferable to the terminal apparatus. Thus, the terminal apparatus can report the PMI2 to indicate which is the preferable precoder among the multiple vectors that the PMI1 indicates to the base station apparatus.

The terminal apparatus can notify information associated with a polarized wave composition using the PMI2. For example, in a case that the base station apparatus and the terminal apparatus perform a precoding transmission using polarized wave antennas, a signal transmitted in the first polarized wave (e.g., an H plane, horizontally polarized wave) and a signal transmitted in the second polarized wave (e.g., a V plane, vertically polarized wave) need to be suitably composed. Then, the terminal apparatus can also report the precoder associated with the composition between the first polarized wave and the second polarized wave using the PMI2.

The PMI1 can further include multiple pieces of information. For example, the PMI1 can be further represented by PMI11 and PMI12. The PMI11 and the PMI12 can be precoders which are calculated by assuming different dimensions (directions).

The PMI2 can be further represented by PMI21 (the first indicator) and PMI22 (the second indicator). In other words, the indicator indicated by the PMI2 can indicate the indicator indicated by the PMI21 and the indicator indicated by the PMI22. The terminal apparatus can report, as the PMI21, multiple vectors to report in the PMI1 as information indicating the complex weights (composition weights) for composing in an identical polarized wave, to the base station apparatus. For example, assume that the terminal apparatus reports four vectors to the base station apparatus in the PMI1. Although the base station apparatus can determine a precoder for the terminal apparatus by using one of four vectors reported in the PMI1, the base station apparatus can use multiple vectors among four vectors at the same time. In this case, how the base station apparatus performs weighting for the multiple vectors to use at the same time is an issue. Then, the terminal apparatus according to the present embodiment notifies, as the PMI21, information indicating the complex weights to be used in composition of the multiple vectors indicated by the PMI1 in the identical polarized wave. According to the former example, the terminal apparatus can report an index indicating a vector expressed by $[a, b, c, d]^T$ as the PMI21 to the base station apparatus. Here, {a, b, c, d} can be complex numbers. {a, b, c, d} represents complex weights to weight the four vectors indicated by the PMI1, respectively. The base station apparatus can suitably compose the multiple vectors reported in the PMI1 by the terminal apparatus reporting the PMI21 to the base station apparatus, and thus a more preferable precoder can be obtained.

The terminal apparatus can calculate the PMI21, based on a prescribed codebook. At this time, at least a part of the prescribed codebook can include information indicating the complex weights to be used in composition of the multiple vectors indicated by the PMI1 like $[a, b, c, d]^T$ described above. The information indicating the complex weights to be used in composition of the multiple vectors indicated by the PMI1 listed in the prescribed codebook can include at least two of a vector including only one non-zero element and a vector including two or more non-zero elements. The codebook includes the vector including only one non-zero element allows the PMI21 to also notify information indicating selection of one vector from the multiple vectors indicated by the PMI1.

The terminal apparatus can report, as the PMI22, information indicating the composition weights in composition of the multiple vectors reported in the PMI1 between polarized waves to the base station apparatus.

As described above, the terminal apparatus according to the present embodiment can report the PMI21 and the PMI22 by reporting the PMI2 to the base station apparatus. The PMI21 and the PMI22 are both indicators indicating the complex weights to be used in composition of the multiple vectors in a prescribed dimension (direction, space). For example, the prescribed dimension (the first dimension) that the PMI21 assumes is in an intra polarized wave, and the index which indicated by the PMI21 indicates the complex weights that are used to compose the multiple vectors indicated by the PMI1 in the identical polarized wave. The prescribed dimension (the second dimension) that the PMI22 assumes is inter polarized waves, and the index indicated by the PMI22 indicates the complex weights that are used to compose the multiple vectors indicated by the PMI1 between polarized waves.

The terminal apparatus can also report the PMI1 to the base station apparatus, and the PMI1, the PMI11 and the PMI12 are indicators indicating the multiple vectors in the prescribed dimension. The terminal apparatus according to the present embodiment can transmit a CSI report including two indicators of the indicator indicating the multiple vectors in the prescribed dimension and the indicator indicating the complex weights to compose the multiple vectors in the prescribed dimension as CSI values, to the base station apparatus.

The terminal apparatus can transmit the PMI1 indicating the PMI11 and the PMI12 and the PMI2 indicating the PMI21 and the PMI22 by being included in one piece of control information, or can separately transmit the PMI1 and the PMI2 as different control information. In a case that the terminal apparatus separately transmits the PMI1 and the PMI2, the transmission cycle can be configured to different values for the PMI1 and the PMI2. In a case that the transmission timings of the PMI1 and the PMI2 are synchronized (collide), the terminal apparatus can give priority to the PMI1 to transmit.

The terminal apparatus 2 can calculate the PMI21 and the PMI22 with reference to different codebooks. The terminal apparatus 2 can calculate the PMI2 with reference to one codebook in which multiple vectors including variables expressed by the PMI21 and the PMI22 as a function as elements are listed. Note that the number of linear filters (vectors, precoders) listed in these codebooks can be configured by the base station apparatus. The base station apparatus may change the number of linear filters directly, or may change the number of linear filters by over-sampling the listed linear filters with the first or second dimension (space, direction) described above.

It is needless to say that the roles of the PMI21 and the PMI22 indicated by the PMI2 may be interchangeable.

The terminal apparatus can notify a combination of the PMI21 and the PMI22 by reporting the PMI2 to the base station apparatus. For example, in a case that the terminal apparatus notifies the PMI2 with X bits, Y (<X) bits can be assigned to the PMI21, and Z (=X-Y) bits can be assigned to the PMI22. At this time, Y and Z may be the same value, or may be different values.

In a case of Y>X (in a case that Y is increased), the candidate numbers of complex weights that are used to compose multiple vectors indicated by the PMI1 in an identical polarized wave can increase, and thus the base station apparatus can perform precoding to direct a beam to the terminal apparatus more accurately.

In a case that Y<X (in a case that X is increased), the candidate numbers of complex weights that are used to compose multiple vectors indicated by the PMI1 between polarized waves can increase, and thus the base station apparatus can perform precoding to direct a beam to the terminal apparatus more accurately in the situation that the terminal apparatus moves.

The terminal apparatus can report an index which is assigned for each of the combinations of the PMI21 and the PMI22 to the base station apparatus as the PMI2.

The terminal apparatus can report the PMI21 and the PMI22 to the base station apparatus independently. In this case, the terminal apparatus can report the PMI21 to the base station apparatus as the PMI2 and can newly report the PMI22 to the base station apparatus as the PMI3.

As described above, the terminal apparatus which the communication system of the present embodiment includes can report CSI including a value that is not reported by a known CSI report. In other words, the terminal apparatus can perform a new CSI report (advanced CSI report) in addition to a known CSI report (legacy CSI report). Here, the legacy CSI report is a CSI report including, as a CSI value, a value specified by or before Rel. 13 of LTE-Advanced.

The advanced CSI report includes a CSI report including information indicating a complex weight when multiple vectors in an identical polarized wave is composed as a CSI value. Specifically, the advanced CSI report includes a CSI report including the PMI21 indicated above or a value including a value indicated by the PMI21 as a CSI value.

The base station apparatus according to the present embodiment can notify whether to request the legacy CSI report or request the advanced CSI report in a higher layer to the terminal apparatus.

The base station apparatus according to the present embodiment can configure whether to request the legacy CSI report or request the advanced CSI report to the terminal apparatus for each of CSI processes. The base station apparatus can configure information indicating a CSI report requested for each of CSI processes.

In a case of requesting the legacy CSI report for terminal apparatus, the base station apparatus according to the present embodiment can configure the number of CSI processes that is larger than the number of the maximum CSI processes configurable for the terminal apparatus, for the terminal apparatus requesting the advanced CSI report. The base station apparatus can configure whether to request the legacy CSI report for the terminal apparatus, or requests the advanced CSI report depending on the number of CSI processes configurable for the terminal apparatus. The base station apparatus can configure the legacy CSI report for the terminal apparatus which cannot configure the number of prescribed CSI processes, and can configure the advanced CSI report for the terminal apparatus which can configure the number of prescribed CSI processes. In other words, for the terminal apparatus which cannot configure the prescribed number of CSI processes, the advanced CSI report cannot be configured.

In a case of configuring multiple CSI processes for the terminal apparatus, the base station apparatus can configure the legacy CSI report for the CSI process with a prescribed number, and can configure the advanced CSI report for the CSI processes with a number larger than the prescribed number. The base station apparatus can configure 3 for the prescribed number.

The base station apparatus can newly define a CSI report type for the advanced CSI report. For a new CSI report type, the base station apparatus can configure a CSI report that includes a value indicating the above-described PMI21 as a CSI value for the terminal apparatus.

The base station apparatus can configure whether to request the advanced CSI report or request the legacy CSI report for the terminal apparatus for each of CSI-RS resources configured to the terminal apparatus. The base station apparatus can configure to request the advanced CSI report only for the prescribed CSI-RS resource configuration. The base station apparatus can request the advanced CSI report for a certain dimension (direction), and can request the legacy report for another dimension (direction). At this time, the terminal apparatus reports the advanced CSI and the CQI/PMI/RI/PTI/CRI. The base station apparatus does not configure the advanced CSI report and the legacy CSI report to the same dimension (direction) at the same time. At this time, the terminal apparatus does not report the CQI/PMI/RI/PTI/CRI in a case that the advanced CSI report is required to a certain dimension (direction).

In a case that the terminal apparatus refers to a prescribed codebook to calculate the PMI2, the base station apparatus can notify the terminal apparatus of information indicating which vector can be a candidate of the PMI2 among multiple vectors listed in the prescribed codebook. For example, the base station apparatus can limit the number of vectors that can be a candidate of the PMI2. For example, the base station apparatus can limit vectors that can be a candidate of the PMI2 to a subset. The base station apparatus can configure the legacy CSI report for the terminal apparatus which configures codebook restrictions (codebook subset restriction), and can configure the advanced CSI report for the terminal apparatus which does not configure codebook restriction. In other words, the terminal apparatus calculates the CSI without codebook restriction in a case that the advanced CSI report is configured.

The base station apparatus can configure whether to configure the legacy CSI report or configure the advanced CSI report for the terminal apparatus, based on the contents (granularity) of codebook restriction. The base station apparatus can configure the legacy CSI report for the terminal apparatus in a case of configuring codebook restriction (Codebook subset restriction) where the number of candidates for the PMI2 is equal to or smaller than the prescribed number, and can configure the advanced CSI report for the terminal apparatus in a case of configuring codebook restriction where the number of candidates for the PMI2 is larger than the prescribed number. On the other hand, the base station apparatus can configure the legacy CSI report for the terminal apparatus in a case of configuring codebook restriction where the number of candidates for the PMI2 is equal to or larger than the prescribed number, and can configure the advanced CSI report for the terminal apparatus in a case of configuring codebook restriction where the number of candidates for the PMI2 is smaller than the prescribed number. In a case that the advanced CSI report is configured, the terminal apparatus calculates the CSI by using the PMI2 of the prescribed number or more. The base station apparatus can configure the codebook restriction for the legacy CSI report and the codebook restriction for the advanced CSI report differently.

Note that, although in the above-mentioned description, the codebook restriction is based on codebook restriction for the codebook to refer to in calculation of the PMI2 by the terminal apparatus, the base station apparatus can configure whether or not to configure the advanced CSI report, based on codebook restriction for the codebook to refer to in calculation of the PMI1 by the terminal apparatus.

The base station apparatus can configure whether or not to configure the advanced CSI report for the terminal apparatus, based on the number of CSI-RS ports configured for the terminal apparatus. For example, the base station apparatus can configure the advanced CSI report for the terminal apparatus in a case that the number of CSI-RS ports is equal to or less than prescribed number. This is because an amount of feedback information increases for the advanced CSI report, and more particularly, an amount of feedback information increases as the number of CSI-RS ports increases.

On the other hand, the base station apparatus can configure the advanced CSI report for the terminal apparatus in a case that the number of CSI-RS ports is equal to or more than a prescribed number. This is because the precision of the CSI report improves for the advanced CSI report, and more particularly, characteristic improvement effects related to the precision improvement for the CSI direction increase as the number of CSI-RS ports increases. Note that the base station apparatus can configure whether or not to configure the advanced CSI report for each number of CSI-RS ports. Although the above-mentioned description assumes a case based on the number of CSI-RS ports, similar processes may be performed based on the number of antenna ports of the base station apparatus rather than the number of CSI-RS ports.

The base station apparatus can configure the advanced CSI report for the terminal apparatus configuring CLASS A as a CSI report type (eMIMO type, extended MIMO type), and can configure the legacy CSI report for the terminal apparatus configuring CLASS B as a CSI report type (eMIMO type, extended MIMO type). In this case, the terminal apparatus can perform the CSI report including a value indicating the PMI21 as a CSI value to the base station apparatus for the CSI report type configured in the CLASS A.

The base station apparatus can configure the advanced CSI report for the terminal apparatus configuring CLASS B as a CSI report type, and can configure the legacy CSI report for the terminal apparatus configuring CLASS A as a CSI report type. In this case, the terminal apparatus can perform the CSI report including a value indicating the PMI21 as a CSI value to the base station apparatus for the CSI report type configured in the CLASS B. In a case that the base station apparatus configures the CLASS B as a CSI report type and configures only one CSI-RS resource configuration, or in the CSI process that configures only one CSI-RS resource configuration, the terminal apparatus can report the advanced CSI, based on the CSI-RS indicated by the configured CSI-RS resource configuration.

In a case that the base station apparatus configures the CLASS B as a CSI report type and configures multiple CSI-RS resource configurations, or in the CSI process that configures multiple CSI-RS resource configurations, the terminal apparatus can perform the advanced CSI report among the multiple CSI-RS resource configurations configured based on the CSI-RS transmitted in the CSI-RS resource indicated by the CRI reported by the terminal apparatus to the base station apparatus.

Note that the base station apparatus can configure multiple CSI report types (eMIMO types, extended MIMO types) at the same time (in one CSI process). For example, the base station apparatus can configure the CLASS A by the first CSI report type (eMIMO type, extended MIMO type), and can configure the CLASS B by the second CSI report type (eMIMO type, extended MIMO type). The base station apparatus can configure the CLASS B where multiple CSI resources are indicated by the first CSI report type (eMIMO type, extension MIMO type), and can configure the CLASS B where one CSI resource configuration is indicated by the second CSI report type (eMIMO type, extension MIMO type).

The base station apparatus can request the advanced CSI report by a CSI trigger for the terminal apparatus. The terminal apparatus can transmit the advanced CSI report to the base station apparatus after some period of time after prescribed time passes after having received the CSI trigger. At this time, the prescribed time in a case that the CSI trigger requests the advanced CSI report can be configured to a value that is shorter than the prescribed time for a case that the CSI trigger requests the legacy CSI report. Specifically, the terminal apparatus requested for the legacy CSI report is assumed to perform the legacy CSI report in the (n+m)-th subframe for the n-th subframe in which the CSI trigger is received. In this case, the terminal apparatus requested for the advanced CSI report can perform the advanced CSI report in the (n+L)-th subframe for the n-th subframe in which the CSI trigger is received, and at this time, the base station apparatus can configure the terminal apparatus to be L≤m.

The terminal apparatus can support certainly to configure L to be L=m, and can notify the base station apparatus of information to indicate whether or not configuring L to be L<m is possible. The base station apparatus does not configure, for L, a value that is smaller than the value that the terminal apparatus can be configured.

FIG. 2 is a schematic block diagram illustrating a configuration of the base station apparatus 1A according to the present embodiment. As illustrated in FIG. 2, the base station apparatus 1A is configured, including a higher layer processing unit (higher layer processing step) 101, a controller (controlling step) 102, a transmitter (transmitting step) 103, a receiver (receiving step) 104, and a transmit and/or receive antenna 105. The higher layer processing unit 101 is configured, including a radio resource control unit (radio resource controlling step) 1011 and a scheduling unit (scheduling step) 1012. The transmitter 103 is configured, including a coding unit (coding step) 1031, a modulation unit (modulating step) 1032, a downlink reference signal generation unit (downlink reference signal generating step) 1033, a multiplexing unit (multiplexing step) 1034, and a radio transmitting unit (radio transmitting step) 1035. The receiver 104 is configured, including a radio receiving unit (radio receiving step) 1041, a demultiplexing unit (demultiplexing step) 1042, a demodulation unit (demodulating step) 1043, and a decoding unit (decoding step) 1044.

The higher layer processing unit 101 performs processing of the Medium Access Control (MAC) layer, the Packet Data Convergence Protocol (PDCP) layer, the Radio Link Control (RLC) layer, and the Radio Resource Control (RRC) layer. Furthermore, the higher layer processing unit 101 generates information necessary for control of the transmitter 103 and the receiver 104, and outputs the generated information to the controller 102.

The higher layer processing unit 101 receives information of a terminal apparatus, such as UE capability or the like, from the terminal apparatus. To rephrase, the terminal apparatus transmits its function to the base station apparatus by higher layer signaling.

Note that in the following description, information of a terminal apparatus includes information indicating whether the stated terminal apparatus supports a prescribed function, or information indicating that the stated terminal apparatus has completed the introduction and test of a prescribed function. In the following description, information of whether the prescribed function is supported includes information of whether the introduction and test of the prescribed function have been completed.

For example, in a case where a terminal apparatus supports a prescribed function, the stated terminal apparatus transmits information (parameters) indicating whether the prescribed function is supported. In a case where a terminal apparatus does not support a prescribed function, the stated terminal apparatus does not transmit information (parameters) indicating whether the prescribed function is supported. In other words, whether the prescribed function is supported is reported by whether information (parameters) indicating whether the prescribed function is supported is transmitted. Information (parameters) indicating whether a prescribed function is supported may be reported using one bit of 1 or 0.

The radio resource control unit 1011 generates, or acquires from a higher node, the downlink data (the transport block) arranged in the downlink PDSCH, system information, the RRC message, the MAC Control Element (CE), and the like. The radio resource control unit 1011 outputs the downlink data to the transmitter 103, and outputs other information to the controller 102. Furthermore, the radio resource control unit 1011 manages various configuration information of the terminal apparatuses.

The scheduling unit 1012 determines a frequency and a subframe to which the physical channels (PDSCH and PUSCH) are allocated, the coding rate and modulation scheme (or MCS) for the physical channels (PDSCH and PUSCH), the transmit power, and the like. The scheduling unit 1012 outputs the determined information to the controller 102.

The scheduling unit 1012 generates the information to be used for the scheduling of the physical channels (PDSCH and PUSCH), based on the result of the scheduling. The scheduling unit 1012 outputs the generated information to the controller 102.

Based on the information input from the higher layer processing unit 101, the controller 102 generates a control signal for controlling of the transmitter 103 and the receiver 104. The controller 102 generates the downlink control information based on the information input from the higher layer processing unit 101, and outputs the generated information to the transmitter 103.

The transmitter 103 generates the downlink reference signal in accordance with the control signal input from the controller 102, codes and modulates the HARQ indicator, the downlink control information, and the downlink data that are input from the higher layer processing unit 101, multiplexes PHICH, PDCCH, EPDCCH, PDSCH, and the downlink reference signal, and transmits a signal obtained through the multiplexing to the terminal apparatus 2 through the transmit and/or receive antenna 105.

The coding unit 1031 codes the HARQ indicator, the downlink control information, and the downlink data that are input from the higher layer processing unit 101, in compliance with the coding scheme prescribed in advance, such as block coding, convolutional coding, or turbo coding, or in compliance with the coding scheme determined by the radio resource control unit 1011. The modulation unit 1032 modulates the coded bits input from the coding unit 1031, in compliance with the modulation scheme prescribed in advance, such as Binary Phase Shift Keying (BPSK), quadrature Phase Shift Keying (QPSK), quadrature amplitude modulation (16 QAM), 64 QAM, or 256 QAM, or in compliance with the modulation scheme determined by the radio resource control unit 1011.

The downlink reference signal generation unit 1033 generates, as the downlink reference signal, a sequence that is already learned to the terminal apparatus 2A and that is acquired in accordance with a rule prescribed in advance based on the physical cell identity (PCI, cell ID) for identifying the base station apparatus 1A, and the like.

The multiplexing unit 1034 multiplexes the modulated modulation symbol of each channel, the generated downlink reference signal, and the downlink control information. To be more specific, the multiplexing unit 1034 maps the modulated modulation symbol of each channel, the generated downlink reference signal, and the downlink control information to the resource elements.

The radio transmitting unit 1035 performs Inverse Fast Fourier Transform (IFFT) on the modulation symbol resulting from the multiplexing or the like, generates an OFDM symbol, attaches a cyclic prefix (CP) to the generated OFDM symbol, generates a baseband digital signal, converts the baseband digital signal into an analog signal, removes unnecessary frequency components through filtering, up-converts a result of the removal into a signal of a carrier frequency, performs power amplification, and outputs a final result to the transmit and/or receive antenna 105 for transmission.

In accordance with the control signal input from the controller 102, the receiver 104 demultiplexes, demodulates, and decodes the reception signal received from the terminal apparatus 2A through the transmit and/or receive antenna 105, and outputs information resulting from the decoding to the higher layer processing unit 101.

The radio receiving unit 1041 converts, by down-converting, an uplink signal received through the transmit and/or receive antenna 105 into a baseband signal, removes unnecessary frequency components, controls the amplification level in such a manner as to suitably maintain a signal level, performs orthogonal demodulation based on an in-phase component and an orthogonal component of the received signal, and converts the resulting orthogonally-demodulated analog signal into a digital signal.

The radio receiving unit 1041 removes a portion corresponding to CP from the digital signal resulting from the conversion. The radio receiving unit 1041 performs Fast Fourier Transform (FFT) on the signal from which CP has been removed, extracts a signal in the frequency domain, and outputs the resulting signal to the demultiplexing unit 1042.

The demultiplexing unit 1042 demultiplexes the signal input from the radio receiving unit 1041 into PUCCH, PUSCH, and the signal such as the uplink reference signal. The demultiplexing is performed based on radio resource allocation information that is determined in advance by the base station apparatus 1A using the radio resource control unit 1011 and is included in the uplink grant notified to each of the terminal apparatuses 2.

Furthermore, the demultiplexing unit 1042 performs compensation of channels including PUCCH and PUSCH. The demultiplexing unit 1042 demultiplexes the uplink reference signal.

The demodulation unit 1043 performs Inverse Discrete Fourier Transform (IDFT) on PUSCH, acquires modulation symbols, and performs reception signal demodulation, that is, demodulates each of the modulation symbols of PUCCH and PUSCH, in compliance with the modulation scheme prescribed in advance, such as BPSK, QPSK, 16 QAM, 64 QAM, 256 QAM, or the like, or in compliance with the modulation scheme that the base station apparatus 1A itself notified in advance, with the uplink grant, each of the terminal apparatuses 2.

The decoding unit 1044 decodes the coded bits of PUCCH and PUSCH, which have been demodulated, at the coding rate in compliance with a coding scheme prescribed in advance, the coding rate being prescribed in advance or being notified in advance with the uplink grant to the terminal apparatus 2 by the base station apparatus 1A itself, and outputs the decoded uplink data and uplink control information to the higher layer processing unit 101. In a case where PUSCH is re-transmitted, the decoding unit 1044 performs the decoding with the coded bits input from the higher layer processing unit 101 and retained in an HARQ buffer, and the demodulated coded bits.

Figure 3:
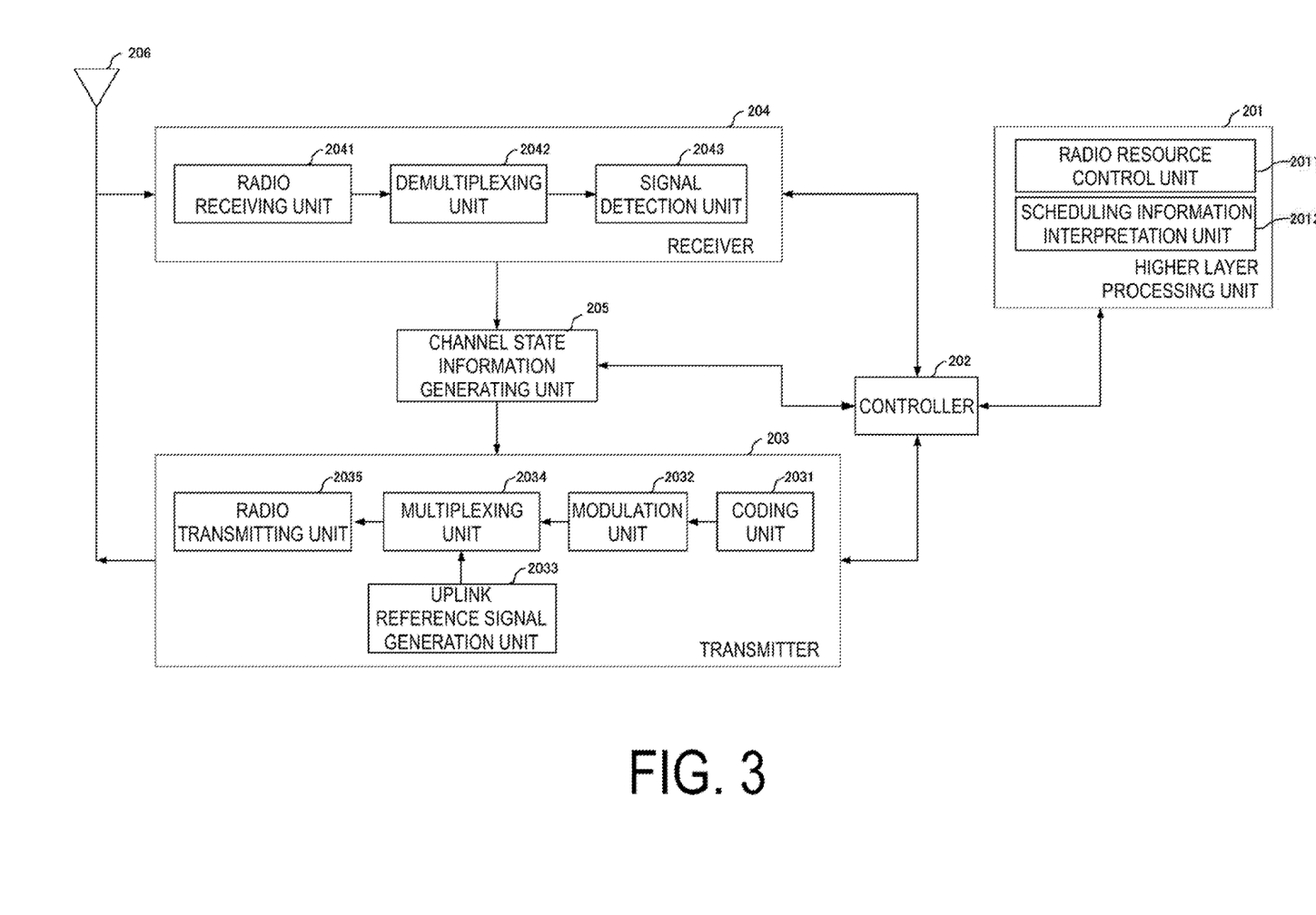
FIG. 3 is a block diagram illustrating a configuration example of a terminal apparatus according to the present embodiment.

FIG. 3 is a schematic block diagram illustrating a configuration of the terminal apparatus 2 according to the present embodiment. As illustrated in FIG. 3, the terminal apparatus 2A is configured, including a higher layer processing unit (higher layer processing step) 201, a controller (controlling step) 202, a transmitter (transmitting step) 203, a receiver (receiving step) 204, a channel state information generating unit (channel state information generating step) 205, and a transmit and/or receive antenna 206. The higher layer processing unit 201 is configured, including a radio resource control unit (radio resource controlling stop) 2011 and a scheduling information interpretation unit (scheduling information interpreting step) 2012. The transmitter 203 is configured, including a coding unit (coding step) 2031, a modulation unit (modulating step) 2032, an uplink reference signal generation unit (uplink reference signal generating step) 2033, a multiplexing unit (multiplexing step) 2034, and a radio transmitting unit (radio transmitting step) 2035. The receiver 204 is configured, including a radio receiving unit (radio receiving step) 2041, a demultiplexing unit (demultiplexing step) 2042, and a signal detection unit (signal detecting step) 2043.

The higher layer processing unit 201 outputs the uplink data (the transport block) generated by a user operation or the like, to the transmitter 203. The higher layer processing unit 201 performs processing of the Medium Access Control (MAC) layer, the Packet Data Convergence Protocol (PDCP) layer, the Radio Link Control (RLC) layer, and the Radio Resource Control (RRC) layer.

The higher layer processing unit 201 outputs, to the transmitter 203, information indicating a terminal apparatus function supported by the terminal apparatus 2A itself.

Furthermore, the radio resource control unit 2011 manages various configuration information of the terminal apparatuses 2A itself. Furthermore, the radio resource control unit 2011 generates information to be mapped to each uplink channel, and outputs the generated information to the transmitter 203.

The radio resource control unit 2011 acquires configuration information of CSI feedback transmitted from the base station apparatus, and outputs the acquired information to the controller 202.

The scheduling information interpretation unit 2012 interprets the downlink control information received through the receiver 204, and determines scheduling information. The scheduling information interpretation unit 2012 generates the control information in order to control the receiver 204 and the transmitter 203 in accordance with the scheduling information, and outputs the generated information to the controller 202.

On the basis of the information input from the higher layer processing unit 201, the controller 202 generates a control signal for controlling the receiver 204, the channel state information generating unit 205, and the transmitter 203. The controller 202 outputs the generated control signal to the receiver 204, the channel state information generating unit 205, and the transmitter 203 to control the receiver 204 and the transmitter 203.

The controller 202 controls the transmitter 203 to transmit CSI generated by the channel state information generating unit 205 to the base station apparatus.

In accordance with the control signal input from the controller 202, the receiver 204 demultiplexes, demodulates, and decodes a reception signal received from the base station apparatus 1A through the transmit and/or receive antenna 206, and outputs the resulting information to the higher layer processing unit 201.

The radio receiving unit 2041 converts, by down-converting, a downlink signal received through the transmit and/or receive antenna 206 into a baseband signal, removes unnecessary frequency components, controls an amplification level in such a manner as to suitably maintain a signal level, performs orthogonal demodulation based on an in-phase component and an orthogonal component of the received signal, and converts the resulting orthogonally-demodulated analog signal into a digital signal.

The radio receiving unit 2041 removes a portion corresponding to CP from the digital signal resulting from the conversion, performs fast Fourier transform on the signal from which CP has been removed, and extracts a signal in the frequency domain.

The demultiplexing unit 2042 demultiplexes the extracted signal into PHICH, PDCCH, EPDCCH, PDSCH, and the downlink reference signal. Further, the demultiplexing unit 2042 makes a compensation of channels including PHICH, PDCCH, and EPDCCH based on a channel estimation value of the desired signal obtained from the channel measurement, detects the downlink control information, and outputs the information to the controller 202. The controller 202 outputs PDSCH and the channel estimation value of the desired signal to the signal detection unit 2043.

The signal detection unit 2043, using PDSCH and the channel estimation value, detects a signal, and outputs the detected signal to the higher layer processing unit 201.

The transmitter 203 generates the uplink reference signal in accordance with the control signal input from the controller 202, codes and modulates the uplink data (the transport block) input from the higher layer processing unit 201, multiplexes PUCCH, PUSCH, and the generated uplink reference signal, and transmits a result of the multiplexing to the base station apparatus 1A through the transmit and/or receive antenna 206.

The coding unit 2031 codes the uplink control information input from the higher layer processing unit 201 in compliance with a coding scheme, such as convolutional coding or block coding. Furthermore, the coding unit 2031 performs turbo coding in accordance with information used for the scheduling of PUSCH.

The modulation unit 2032 modulates coded bits input from the coding unit 2031, in compliance with the modulation scheme notified with the downlink control information, such as BPSK, QPSK, 16 QAM, or 64 QAM, or in compliance with a modulation scheme prescribed in advance for each channel.

The uplink reference signal generation unit 2033 generates a sequence acquired according to a rule (formula) prescribed in advance, based on a physical cell identity (PCI, also referred to as a Cell ID or the like) for identifying the base station apparatus 1A, a bandwidth to which the uplink reference signal is mapped, a cyclic shift notified with the uplink grant, a parameter value for generation of a DMRS sequence, and the like.

In accordance with the control signal input from the controller 202, the multiplexing unit 2034 rearranges modulation symbols of PUSCH in parallel and then performs Discrete Fourier Transform (DFT) on the rearranged modulation symbols. Furthermore, the multiplexing unit 2034 multiplexes PUCCH and PUSCH signals and the generated uplink reference signal for each transmit antenna port. To be more specific, the multiplexing unit 2034 maps the PUCCH and PUSCH signals and the generated uplink reference signal to the resource elements for each transmit antenna port.

The radio transmitting unit 2035 performs Inverse Fast Fourier Transform (IFFT) on a signal resulting from the multiplexing, performs the modulation of SC-FDMA scheme, generates an SC-FDMA symbol, attaches CP to the generated SC-FDMA symbol, generates a baseband digital signal, converts the baseband digital signal into an analog signal, removes unnecessary frequency components, up-converts a result of the removal into a signal of a carrier frequency, performs power amplification, and outputs a final result to the transmit and/or receive antenna 206 for transmission.

A program running on an apparatus according to one aspect of the present invention may serve as a program that controls a Central Processing Unit (CPU) and the like to cause a computer to operate in such a manner as to realize the functions of the above-described embodiment according to one aspect of the present invention. Programs or the information handled by the programs are temporarily read into a volatile memory, such as a Random Access Memory (RAM) while being processed, or stored in a non-volatile memory, such as a flash memory, or a Hard Disk Drive (HDD), and then read by the CPU to be modified or rewritten, as necessary.

Moreover, the apparatuses in the above-described embodiment may be partially enabled by a computer. In such a case, a program for realizing functions of the embodiment may be recorded on a computer-readable recording medium. This configuration may be realized by causing a computer system to read the program recorded on the recording medium for execution. It is assumed that the "computer system" refers to a computer system built into the apparatuses, and the computer system includes an operating system and hardware components such as a peripheral apparatus.

Furthermore, the "computer-readable recording medium" may be any of a semiconductor recording medium, an optical recording medium, a magnetic recording medium, and the like.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Furthermore, each functional block or various characteristics of the apparatuses used in the above-described embodiment may be implemented or performed on an electric circuit, that is, typically an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor and may be a processor of known type, a controller, a micro-controller, or a state machine. The above-mentioned electric circuits may be constituted of a digital circuit, or may be constituted of an analog circuit. Furthermore, in a case that with advances in semiconductor technology, a circuit integration technology that replaces the present integrated circuits is introduced, it is also possible to use an integrated circuit based on the technology.

Note that the invention of the present patent application is not limited to the above-described embodiment. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiment of the present invention has been described in detail above referring to the drawings, but the specific configuration is not limited to the embodiment and includes, for example, an amendment to a design that falls within the scope that does not depart from the gist of the present invention. Furthermore, various modifications are possible within the scope of one aspect of the present invention defined by claims, and embodiments that are made by suitably combining technical means disclosed according to the different embodiments are also included in the technical scope of one aspect of the present invention. Furthermore, a configuration in which constituent elements, described in the respective embodiments and having mutually the same effects, are substituted for one another is also included in the technical scope of the present invention.

INDUSTRIAL APPLICABILITY

The present invention can be preferably used in a base station apparatus, a terminal apparatus, and a communication method.

The present international application claims priority based on JP 2016-191050 filed on Sep. 29, 2016, and all the contents of JP 2016-191050 are incorporated in the present international application by reference.

REFERENCE SIGNS LIST

1A Base station apparatus
2A, 2B Terminal apparatus
101 Higher layer processing unit
102 Controller
103 Transmitter
104 Receiver
105 Transmit and/or receive antenna
1011 Radio resource control unit
1012 Scheduling unit
1031 Coding unit
1032 Modulation unit
1033 Downlink reference signal generation unit
1034 Multiplexing unit
1035 Radio transmitting unit
1041 Radio receiving unit
1042 Demultiplexing unit
1043 Demodulation unit
1044 Decoding unit
201 Higher layer processing unit
202 Controller
203 Transmitter
204 Receiver
205 Channel state information generating unit
206 Transmit and/or receive antenna
2011 Radio resource control unit
2012 Scheduling information interpretation unit
2031 Coding unit
2032 Modulation unit
2033 Uplink reference signal generation unit
2034 Multiplexing unit
2035 Radio transmitting unit
2041 Radio receiving unit
2042 Demultiplexing unit
2043 Signal detection unit

The invention claimed is:

1. A terminal apparatus configured to communicate with a base station apparatus, the terminal apparatus comprising:
reception circuitry configured to receive a plurality of channel state information-reference signals (CSI-RSs), the plurality of CSI-RSs being transmitted from a plurality of antenna ports, the plurality of antenna ports being more than a predetermined quantity, and receive, via a higher-layer signaling, configuration information related to a CSI process, and
transmission circuitry configured to report CSI corresponding to the plurality of CSI-RSs, wherein
the configuration information related to the CSI process indicates that the CSI includes information indicating a plurality of complex weights in a case where a first plurality of vectors and a second plurality of vectors are combined,
the CSI indicates the first plurality of vectors and the second plurality of vectors in which each of the first plurality of vectors includes a first plurality of elements, a quantity of elements of the first plurality of elements is same among the first plurality of vectors, each of the second plurality of vectors includes a second plurality of elements, a quantity of elements of the second plurality of elements is same among the second plurality of vectors, and the first plurality of vectors are in a different dimension from the second plurality of vectors, and the CSI indicates the plurality of complex weights on the first plurality of vectors and the second plurality of vectors based on the configuration information related to the CSI process.

2. A base station apparatus configured to communicate with a terminal apparatus, the base station apparatus comprising:

transmission circuitry configured to transmit a plurality of channel state information-reference signals (CSI-RSs) by using a plurality of antenna ports, the plurality of antenna ports being more than a predetermined quantity, and transmit, via a higher-layer signaling, configuration information related to a CSI process, and reception circuitry configured to receive CSI corresponding to the plurality of CSI-RSs, wherein the configuration information related to the CSI process indicates that the CSI includes information indicating a plurality of complex weights in a case where a first plurality of vectors and a second plurality of vectors are combined, the CSI indicates the first plurality of vectors and the second plurality of vectors in which each of the first plurality of vectors includes a first plurality of elements, a quantity of elements of the first plurality of elements is same among the first plurality of vectors, each of the second plurality of vectors includes a second plurality of elements, a quantity of elements of the second plurality of elements is same among the second plurality of vectors, and the first plurality of vectors are in a different dimension from the second plurality of vectors, and the CSI indicates the plurality of complex weights on the first plurality of vectors and the second plurality of vectors based on the configuration information related to the CSI process.

3. A communication method for a terminal apparatus configured to communicate with a base station apparatus, the communication method comprising:

receiving a plurality of channel state information-reference signals (CSI-RSs), the plurality of CSI-RSs being transmitted from a plurality of antenna ports, the plurality of antenna ports being more than a predetermined quantity, and receive, via a higher-layer signaling, configuration information related to a CSI process, and reporting CSI corresponding to the plurality of CSI-RS, wherein the configuration information related to the CSI process indicates that the CSI includes information indicating a plurality of complex weights in a case where a first plurality of vectors and a second plurality of vectors are combined, the CSI indicates the first plurality of vectors and the second plurality of vectors in which each of the first plurality of vectors includes a first plurality of elements, a quantity of elements of the first plurality of elements is same among the first plurality of vectors, each of the second plurality of vectors includes a second plurality of elements, a quantity of elements of the second plurality of elements is same among the second plurality of vectors, and the first plurality of vectors are in a different dimension from the second plurality of vectors, and the CSI indicates a-the plurality of complex weights on the first plurality of vectors and the second plurality of vectors based on the configuration information related to the CSI process.

4. A communication method for a base station apparatus configured to communicate with a terminal apparatus, the communication method comprising:

transmitting a plurality of channel state information-reference signals (CSI-RSs) by using a plurality of antenna ports, the plurality of antenna ports being more than a predetermined quantity, and transmitting, via a higher-layer signaling, configuration information related to a CSI process, and receiving CSI corresponding to the plurality of CSI-RSs, wherein the configuration information related to the CSI process indicates that the CSI includes information indicating a plurality of complex weights in a case where a first plurality of vectors and a second plurality of vectors are combined, the CSI indicates the first plurality of vectors and the second plurality of vectors in which each of the first plurality of vectors includes a first plurality of elements, a quantity of elements of the first plurality of elements is same among the first plurality of vectors, each of the second plurality of vectors includes a second plurality of elements, a quantity of elements of the second plurality of elements is same among the second plurality of vectors, and the first plurality of vectors are in a different dimension from the second plurality of vectors, and the CSI indicates the plurality of complex weights on the first plurality of vectors and the second plurality of vectors based on the configuration information related to the CSI process.

* * * * *